United States Patent
Pandharipande et al.

(10) Patent No.: US 11,026,318 B2
(45) Date of Patent: Jun. 1, 2021

(54) LIGHTING SENSOR ANALYSIS

(71) Applicant: SIGNIFY HOLDING B.V., Eindhoven (NL)

(72) Inventors: Ashish Vijay Pandharipande, Eindhoven (NL); David Ricardo Caicedo Fernandez, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 34 days.

(21) Appl. No.: 16/319,542

(22) PCT Filed: Jul. 12, 2017

(86) PCT No.: PCT/EP2017/067516
§ 371 (c)(1),
(2) Date: Jan. 22, 2019

(87) PCT Pub. No.: WO2018/019582
PCT Pub. Date: Feb. 1, 2018

(65) Prior Publication Data
US 2020/0187338 A1    Jun. 11, 2020

(30) Foreign Application Priority Data
Jul. 26, 2016 (EP) .................................. 16181262

(51) Int. Cl.
*H05B 47/20* (2020.01)
*H05B 47/115* (2020.01)
(Continued)

(52) U.S. Cl.
CPC ........... *H05B 47/20* (2020.01); *G01J 1/0228* (2013.01); *H05B 47/11* (2020.01); *H05B 47/115* (2020.01); *H05B 47/19* (2020.01)

(58) Field of Classification Search
None
See application file for complete search history.

(56) References Cited

U.S. PATENT DOCUMENTS

| 8,820,782 B2 * | 9/2014 | Breed | B60N 2/888 280/735 |
| 9,651,416 B2 * | 5/2017 | Birru | G01J 1/0228 |

(Continued)

FOREIGN PATENT DOCUMENTS

| CN | 1949110 A | 4/2007 |
| CN | 102340811 A | 2/2012 |

(Continued)

OTHER PUBLICATIONS

Spatial correlation parameters by Ernest Bonek 2011 MIMI.*

(Continued)

*Primary Examiner* — Amy Cohen Johnson
*Assistant Examiner* — Srinivas Sathiraju (57) ABSTRACT

A method for identifying sensor units (3) at fault in a lighting system (1) performed using three or more sensor units (3), each respective one of the sensor units (3) comprising a respective sensor (116) configured to generate sensor data, the method comprising at an external processing apparatus (20) external to the sensor units (3): receiving from each of the sensor units (3) the sensor data; generating correlation parameters from the sensor data for selected pairs of neighbouring sensor units (3); and monitoring the correlation parameters to determine a sensor unit (3) at fault.

14 Claims, 6 Drawing Sheets

(51) Int. Cl.
*H05B 47/11* (2020.01)
*G01J 1/02* (2006.01)
*H05B 47/19* (2020.01)

(56) References Cited

U.S. PATENT DOCUMENTS

| | | | |
|---|---|---|---|
| 9,912,422 B2* | 3/2018 | Quezada | G07C 9/37 |
| 10,448,006 B2* | 10/2019 | Caicedo Fernandez | H04N 5/2256 |
| 2011/0215724 A1* | 9/2011 | Chakravarty | H05B 47/10 315/152 |
| 2015/0069920 A1* | 3/2015 | Denteneer | G01M 11/00 315/152 |
| 2015/0073750 A1* | 3/2015 | Birru | G01J 1/0228 702/183 |
| 2017/0245455 A1* | 8/2017 | Van Halsema | G05D 7/0635 |
| 2019/0005317 A1* | 1/2019 | Uhlemann | H04L 43/0876 |
| 2019/0045180 A1* | 2/2019 | Caicedo Fernandez | H04N 5/2256 |

FOREIGN PATENT DOCUMENTS

| | | |
|---|---|---|
| CN | 104221475 A | 12/2014 |
| WO | 2012140152 A1 | 10/2012 |
| WO | WO2013153490 A2 | 10/2013 |
| WO | WO2015028921 A1 | 3/2015 |

OTHER PUBLICATIONS

Joseph Lee Rodgers, et al., "Thirteen Ways to Look at the Correlation Coefficient", The American Statistician, Feb. 19, 1988, pp. 59-66.

* cited by examiner

LIGHTING SENSOR ANALYSIS

CROSS-REFERENCE TO PRIOR APPLICATIONS

This application is the U.S. National Phase application under 35 U.S.C. § 371 of International Application No. PCT/EP2017/067516, filed on Jul. 12, 2017, which claims the benefit of European Patent Application No. 16181262.3, filed on Jul. 26, 2016. These applications are hereby incorporated by reference herein.

TECHNICAL FIELD

The present disclosure relates to a lighting sensor analysis system for determining sensor failures and recommissioning a lighting system based on the determined sensor failures.

BACKGROUND

A lighting system for illuminating an environment may comprise one or more luminaires, each of which comprises one or more lamps that emit illumination into the environment, plus any associated socket, housing or support. Each lamp may take any suitable form, for example an LED-based lamp comprising one or more LEDs, or a filament bulb, gas discharge lamp, etc.

Such luminaires may be inter-connected so as to form a lighting network. For example, in order to control the illumination, a gateway, such as a lighting bridge, may be connected to the network. The gateway can be used to communicate control signals via the network to each of the luminaires, for example from a general-purpose computer device such as a smartphone, tablet or laptop connected to the gateway.

The lighting network may have a mesh topology, whereby the luminaires themselves act as relays within the lighting network, relaying control signals between the gateway and other luminaires in the network. Alternatively, the network may have a star topology, whereby luminaires communicate with the gateway "directly" i.e. without relying on other luminaires to relay the control signals (though possibly via other dedicated network components). Generally, the network can have any suitable network topology, e.g. based on a combination of star-like and mesh-like connections. In one example, the lighting network may for example operate in accordance with one of the ZigBee protocols, while the computer device connects to the gateway via another protocol such as Wi-Fi.

The luminaires or the lighting system may also be equipped with sensor mechanisms. Historically, such sensor mechanisms have been relatively unsophisticated. For example, combinations of timers and motion sensors have been used to selectively active luminaires in response to recently sensed movement in the environment. An example of such a motion sensor is a passive infra-red ("PIR") motion sensor, which uses infrared radiation emitted from moving bodies to detect their motion.

More modern lighting systems can incorporate sensors into the lighting network, so as to allow the aggregation of sensor data from multiple sensors in the environment. Using suitable sensors, this allows the luminaires to share information on, say, occupancy, activity patterns, changes in temperature or humidity, light levels, etc. These sensor signals may be communicated via the lighting network to the gateway, thereby making them available to the (or a) computer device connected to the gateway. Furthermore increasingly, data from sensors in such smart lighting systems may be stored in the Cloud or some backend system. Sensor and luminaire control data (e.g. occupancy, light sensor, energy consumption values) over large periods of time (e.g. months) may be made available for analysis.

Connected smart lighting systems with multiple luminaires and sensors require complex commissioning and configuration software to manage the system. Errors made during commissioning and/or caused by system failures during operation of the system are often difficult to detect. Many of such errors either go unreported, or are reported manually with no (or with delayed) feedback to a lighting maintenance services person.

US 2011/0215724 discloses the uses of redundant sensors in such a way that if value provided by a sensor are out of a predetermined range then another sensor can be used. In WO 2013/153490, a sensor is considered to provide a signal that have a variation range in time and a time correlation parameter is defined for tracking this time variation and detecting fault of the sensor.

Typically fault detection has largely focussed on methods for diagnosing specific commissioning errors. For instance, luminaires can be actuated in a specific pattern and the spatial illuminance response analysed to detect vision sensor commissioning errors. In these methods, only limited data is used over time since the underlying measurements are collected over short time periods (typically order of seconds or minutes). This is since the measurements are either carried out manually or stored (with limitations on memory size).

SUMMARY

A number of potential problems may occur with an image sensing unit during operation. For instance, the sensor may move or be misaligned compared to its intended position or orientation for example due to some collision with another body or during maintenance of the structure supporting the lighting system. Furthermore the sensor unit may develop an internal fault (e.g. failure of the sensor element, or malware). The inventors have recognized that while sensor information from individual sensors is typically insufficient to detect a fault by comparing sensor data for multiple sensors faults may be determined and indications passed to lighting maintenance services and/or re-commissioning of the lighting system to take into account of the determined fault.

According to one aspect disclosed herein, there is provided a method for identifying sensor units at fault in a lighting system performed using three or more sensor units, each respective one of the sensor units comprising a respective sensor configured to generate sensor data over time, the method comprising at an external processing apparatus external to the sensor units: receiving from each of the sensor units the sensor data; generating spatial correlation parameters from the sensor data for each pair of neighbouring sensor units; and monitoring the spatial correlation parameters to determine a sensor unit at fault.

The spatial correlation parameter can shows if the sensors of a pair react in a same direction or not. The correlation parameter is representative of the correlation between the output of the two sensors of the pair. Typically, two neighbouring sensor should detect the same event and should react in the same manner. A spatial correlation parameter indicates that the two sensors are correlated, i.e. information in relation with each other. If there is no more correlation, that means one of the sensors has failed. Three sensors defining three pairs enable to determine which of the sensor fails.

Generating spatial correlation parameters from the sensor data for each pair of neighbouring sensor units may comprise: selecting each pair of neighbouring sensor units; and correlating the sequence of sensor data for each selected pair of neighbouring sensor units to generate one spatial correlation parameters associated to each pair.

Correlating the sequence of sensor data for the selected pairs of neighbouring sensor units to generate correlation parameters may comprise determining:

$$\alpha_{m,n} = \frac{<s_m - \bar{s}_m, s_n - \bar{s}_n>}{|s_m - \bar{s}_m||s_n - \bar{s}_n|}$$

where $\alpha_{m,n}$ is the correlation parameter for a first sensor unit m and a second sensor unit n within a selected pair of neighbouring sensor units, $s_m$ is the sensor data for the first sensor unit, $s_n$ is the sensor data for the second sensor unit, $\bar{s}_m$ and $\bar{s}_n$ are respectively the arithmetic mean of the sensor data of the first and second sensor units, $<>$ a correlation operation and $\|$ a norm operation.

The respective sensor may be an occupancy sensor and receiving from each of the sensor units the sensor data may comprise receiving from each of the sensor units at least one of: occupancy detection values; occupancy parameter values; occupancy binary detection values; and occupancy state vector based on applying a hold timer to occupancy binary detection values.

The respective sensor may be a light sensor and receiving from each of the sensor units the sensor data may comprise receiving from each of the sensor units at least one of: illumination value; and change in illumination value.

Monitoring the correlation parameters to determine the sensor unit at fault may comprise: determining a sensor unit at fault by determining a sensor unit common to at least two identified selected pairs of neighbouring sensor units where the correlation parameters from the sensor data for selected pairs of neighbouring sensor units is less than a defined threshold value.

Determining the sensor unit at fault by determining the sensor unit common to at least two identified selected pairs of neighbouring sensor units where the correlation parameter from the sensor data for selected pairs of neighbouring sensor units is less than a defined threshold value may comprise: comparing, for multiple selections of neighbouring sensor units, the correlation parameters from the sensor data for selected pairs of neighbouring sensor units with the defined threshold value; identifying sensor units where the correlation parameters from the sensor data for the selected pairs of neighbouring sensor units are less than the defined threshold value; and identifying multiple occurrences of the identified sensor units where the correlation parameters from the sensor data for selected pairs of neighbouring sensor units are less than the defined threshold value.

The method may further comprise generating at least one message identifying the sensor unit at fault, the at least one message to be reported to a facilities manager.

The method may further comprise reconfiguring the lighting system based on determining the sensor unit at fault.

Reconfiguring the lighting system based on determining the sensor unit at fault may further comprise: identifying a control zone which comprises the sensor unit at fault; identifying a functional sensor unit within the control zone which comprises the sensor unit at fault; and associating at least one luminaire within the control zone currently associated with sensor unit at fault with the functional sensor unit.

Identifying a functional sensor unit within the control zone which comprises the sensor unit at fault may comprise: identifying a sensor unit within the control zone with the highest correlation parameters.

A computer program product comprising code embodied on a computer-readable storage medium, the code being configured so as when run on said external processing apparatus may perform the method described herein.

According to a second aspect there is provided a lighting system comprising three or more sensor units, each respective one of the sensor units comprising a respective sensor configured to generate sensor data over time; a unit for identifying a sensor unit at fault operatively coupled to each of the sensor units but external to the sensor units, wherein the unit for identifying a sensor unit at fault is configured to: receive from each of the sensor units the sensor data; generate spatial correlation parameters from the sensor data for each pair of neighbouring sensor units; and monitor the spatial correlation parameters to determine a sensor unit at fault.

The unit for identifying the sensor unit at fault configured to correlate the sequence of sensor data for the selected pairs of neighbouring sensor units to generate correlation parameters may be configured to determine:

$$\alpha_{m,n} = \frac{<s_m - \bar{s}_m, s_n - \bar{s}_n>}{|s_m - \bar{s}_m||s_n - \bar{s}_n|}$$

where $\alpha_{m,n}$ is the correlation parameter for a first sensor unit m and a second sensor unit n within a selected pair of neighbouring sensor units, $s_m$ is the sensor data for the first sensor unit, $s_n$ is the sensor data for the second sensor unit, $\bar{s}_m$ and $\bar{s}_n$ are respectively the arithmetic mean of the sensor data of the first and second sensor units, $<>$ a correlation operation and $\|$ a norm operation.

The respective sensor may be an occupancy sensor and the external processing device configured to receive from each of the sensor units the sensor data may be configured to receive from each of the sensor units at least one of: occupancy detection values; occupancy parameter values; occupancy binary detection values; and occupancy state vector based on applying a hold timer to occupancy binary detection values.

The respective sensor may be a light sensor and the external processing device configured to receive from each of the sensor units the sensor data may be configured to receive from each of the sensor units at least one of: illumination value; and change in illumination value.

The unit for identifying the sensor unit at fault configured to monitor the correlation parameters to determine the sensor unit at fault may be configured to: determine the sensor unit at fault by determining a sensor unit common to at least two identified selected pairs of neighbouring sensor units where the correlation parameters from the sensor data for selected pairs of neighbouring sensor units is less than a defined threshold value.

The unit for identifying a sensor unit at fault configured to determine the sensor unit at fault by determining the sensor unit common to at least two identified selected pairs of neighbouring sensor units where the correlation parameter from the sensor data for selected pairs of neighbouring sensor units is less than a defined threshold value may be configured to: compare, for multiple selections of neighbouring sensor units, the correlation parameters from the sensor data for selected pairs of neighbouring sensor units with the defined threshold value; identify sensor units where the correlation parameters from the sensor data for the selected pairs of neighbouring sensor units are less than the defined threshold value; and identify multiple occurrences of the identified sensor units where the correlation parameters from the sensor data for selected pairs of neighbouring sensor units are less than the defined threshold value.

The unit for identifying a sensor unit at fault may be further configured to generate at least one message identifying the sensor unit at fault, the at least one message to be reported to a facilities manager.

The lighting system may further comprise: at least one luminaire within a control zone comprising the at least two sensor units; a unit for identifying a functional sensor unit from the at least two sensor units; and a unit for controlling the lighting system. The unit for identifying the sensor unit at fault may be configured to generate and send a message identifying the sensor unit at fault to the unit for controlling the lighting system. The unit for identifying the functional sensor unit may be configured to generate and send a message identifying the functional sensor unit to the unit for controlling the lighting system. The unit for controlling the lighting system may be configured to reassociate the at least one luminaire within the control zone with the functional sensor based on the message identifying the sensor unit at fault to the unit for controlling the lighting system and the message identifying the functional sensor unit to the unit for controlling the lighting system.

The unit for identifying the functional sensor unit may be configured to: identify one of the at least two sensor units with the highest correlation parameters as the functional sensor unit.

According to a third aspect there is provided a lighting system comprising: three or more sensor units, each respective one of the sensor units comprising a respective sensor configured to generate sensor data over time; an external processing device operatively coupled to each of the sensor units but external to the sensor units, wherein the external processing device is configured to: receive from each of the sensor units the sensor data; generate correlation parameters from the sensor data for selected pairs of neighbouring sensor units; and monitor the correlation parameters to determine a sensor unit at fault.

The external processing device configured to generate correlation parameters from the sensor data for selected pairs of neighbouring sensor units may be configured to: select pairs of neighbouring sensor units; and correlate the sequence of sensor data for the selected pairs of neighbouring sensor units to generate correlation parameters.

The external processing device configured to correlate the sequence of sensor data for the selected pairs of neighbouring sensor units to generate correlation parameters may be configured to determine:

$$\alpha_{m,n} = \frac{<s_m - \bar{s}_m, s_n - \bar{s}_n>}{|s_m - \bar{s}_m||s_n - \bar{s}_n|}$$

where $\alpha_{m,n}$ is the correlation parameter for a first sensor unit m and a second sensor unit n within a selected pair of neighbouring sensor units, $s_m$ is the sensor data for the first sensor unit, $s_n$ is the sensor data for the second sensor unit, $\bar{s}_m$ and $\bar{s}_n$ are respectively the arithmetic mean of the sensor data of the first and second sensor units, $< >$ a correlation operation and $\|$ a norm operation.

The respective sensor may be an occupancy sensor and the external processing device configured to receive from each of the sensor units the sensor data may be configured to receive from each of the sensor units at least one of: occupancy detection values; occupancy parameter values; occupancy binary detection values; and occupancy state vector based on applying a hold timer to occupancy binary detection values.

The respective sensor may be a light sensor and the external processing device configured to receive from each of the sensor units the sensor data may be configured to receive from each of the sensor units at least one of: illumination value; and change in illumination value.

The external processing device configured to monitor the correlation parameters to determine the sensor unit at fault may be configured to: determine a sensor unit at fault by determining a sensor unit common to at least two identified selected pairs of neighbouring sensor units where the correlation parameters from the sensor data for selected pairs of neighbouring sensor units is less than a defined threshold value.

The external processing device configured to determine the sensor unit at fault by determining the sensor unit common to at least two identified selected pairs of neighbouring sensor units where the correlation parameter from the sensor data for selected pairs of neighbouring sensor units is less than a defined threshold value may be configured to: compare, for multiple selections of neighbouring sensor units, the correlation parameters from the sensor data for selected pairs of neighbouring sensor units with the defined threshold value; identify sensor units where the correlation parameters from the sensor data for the selected pairs of neighbouring sensor units are less than the defined threshold value; and identify multiple occurrences of the identified sensor units where the correlation parameters from the sensor data for selected pairs of neighbouring sensor units are less than the defined threshold value.

The external processing device may be further configured to generate at least one message identifying the sensor unit at fault, the at least one message to be reported to a facilities manager.

The external processing device may be further configured to reconfigure the lighting system based on determining the sensor unit at fault.

The external processing device configured to reconfigure the lighting system based on determining the sensor unit at fault may further be configured to: identify a control zone which comprises the sensor unit at fault; identify a functional sensor unit within the control zone which comprises the sensor unit at fault; and associate at least one luminaire within the control zone currently associated with sensor unit at fault with the functional sensor unit.

The external processing device configured to identify a functional sensor unit within the control zone which comprises the sensor unit at fault may be configured to: identify a sensor unit within the control zone with the highest correlation parameters.

In further embodiments, the system may be further configured in accordance with any of the methods disclosed herein.

BRIEF DESCRIPTION OF THE DRAWINGS

For a better understanding of the present invention, and to show how embodiments of the same may be carried into effect, reference is made to the following figures, in which.

DETAILED DESCRIPTION OF EMBODIMENTS

The following discloses a system for offering sensor fault determination applications in a connected lighting system. In such a system, operational phase faults due to misplacement or failures in sensors can lead to higher-level application errors, e.g. errors in lighting control. The following provides a system and method for detecting such failures and errors by analysing neighbouring pairs of sensor occupancy state time series (or illumination measurements) to detect an error or fault, based on the fact that the neighbouring sensors when operating according to specification and commissioning will have a significant degree of correlation.

In one embodiment, over a common control area occupancy state time series of a sensor within the control area and neighbouring sensors (either at the same or neighbouring control area) are correlated to determine a series of correlation coefficients. The correlation coefficients may be then compared against a set or determined threshold value. Where a correlation coefficient is below the set threshold the system may issue an indicator/flag/alarm to indicate a faulty sensor.

Furthermore in some embodiments having repeated the above determination of correlation coefficients for all sensors in the control area a functional sensor can be determined from the sensor with the highest correlation coefficient of occupancy state time series with neighbouring sensors. This highest correlation coefficient may for example be a multi-dimensional vector comparison or an averaging of coefficient values.

Having determined a functional sensor within a control area, in some embodiments a recommissioning of the control area may be performed by de-associating luminaires with the faulty sensor unit(s) and associating luminaires in that area with a functional sensor unit.

Figure 1:
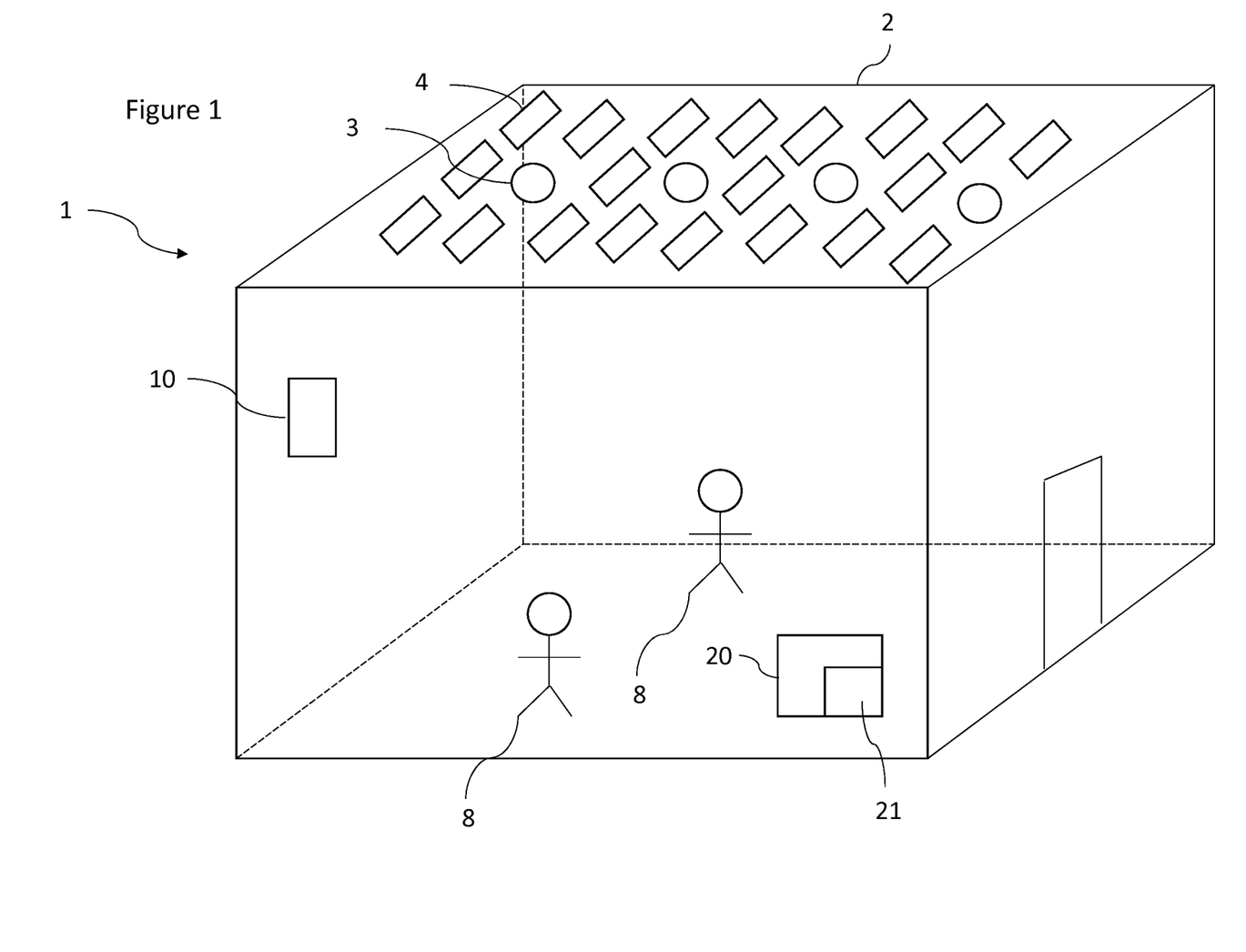
FIG. 1 is a schematic illustration of a lighting system.

FIG. 1 illustrates an exemplary lighting system 1 in which the technique disclosed herein may be employed. The system 1 comprises a plurality of luminaires 4 installed in an environment 2, arranged to emit illumination in order to illuminate that environment 2. In embodiments, the system may further comprise a gateway 10 to which each of the luminaires 4 is connected via a first wired or wireless networking technology such as ZigBee. The gateway 10, sometimes referred to as a lighting bridge, connects to a computing apparatus 20 (which may or may not be physically present in the environment 2) via a second wired or wireless networking technology such as Wi-Fi or Ethernet. The computing apparatus 20 may for example take the form of a server (comprising one or more server units at one or more sites), or a user terminal such as a smartphone, tablet, laptop or desktop computer, or a combination of any such device. It is able to control the luminaires 4 by sending control commands to the luminaires 4 via the gateway 10, and/or is able to receive status reports from the luminaires 4 via the gateway 10. Alternatively in embodiments the gateway 10 may not be required and the computing apparatus 20 and luminaires 4 may be equipped with the same wired or wireless networking technology, by which they may be connected directly into the same network in order for the computing apparatus 20 to control the luminaires 4 and/or receive the status reports from the luminaires 4.

In the illustrated example, the environment 2 is an indoor space within a building, such as one or more rooms and/or corridors (or part thereof). The luminaires 4 are ceiling-mounted, so as to be able to illuminate a surface below them (e.g. the ground or floor, or a work surface). They are arranged in a grid along two mutually perpendicular directions in the plane of the ceiling, so as to form two substantially parallel rows of luminaires 4, each row being formed by multiple luminaires 4. The rows have an approximately equal spacing, as do the individual luminaires 4 within each row. However it will be appreciated that this is not the only possible arrangement. E.g. in other arrangements one or more of the luminaires 4 could be mounted on the wall, or embedded in the floor or items of furniture; and/or the luminaires 4 need not be arranged in a regular grid; and/or the environment 2 may comprise an outdoor space such as a garden or park, or a partially-covered space such as a stadium or gazebo (or part thereof), or a combination of such spaces.

Multiple people 8 (of which two are shown in FIG. 1) may occupy the environment, standing on the floor below the luminaires 4. The environment 2 is also installed with one or more sensor units 3. In some embodiments the sensor units 3 may be a visible-light based imaging unit for detecting the presence of people 8 in the environment based on the images it captures. E.g. these may also be mounted on the ceiling in a regular pattern amongst the luminaires 4, and may be arranged to face downwards towards the illuminated surface beneath (e.g. the ground or floor, or a work surface). Alternatively the sensor units 3 may be mounted in other places such as the wall, facing in other directions than downwards; and/or they need not be installed in a regular pattern.

The luminaires 4 have known identifiers ("IDs"), unique within the system in question, and are installed at known locations. The sensor units 3 also have known IDs, and are also installed at (at least what are initially believed to be) known locations in the environment 2. The sensor units 3 are not necessarily co-located with the luminaires 4. The locations of the luminaires 4 are determined during a commissioning phase of the luminaires 4, i.e. before the luminaires 4 and sensor units 3 are actually put into operation for their purpose of illuminating the environment 2 and detecting presence of people 8 respectively. Typically commissioning is performed at the time of installation or shortly afterwards. During commissioning of the luminaires 4, a commissioning technician determines the location of each of the luminaires 4, either manually or using automated means such as GPS or another such satellite based positioning system. This may be the location on any suitable reference frame, e.g. coordinates on a floorplan, map of the area, or global coordinates. By whatever means and in whatever terms determined, the commissioning technician then records the location of each luminaire 4 in a commissioning database 21 mapped to its respective luminaire ID. The commissioning technician also performs a similar commissioning process for the sensors 3 during a commissioning phase of the sensor units 3, i.e. prior to the actual operational phase, before the sensor units 3 are actually put into operation for their purpose of detecting presence of people 8. The sensor commissioning phase comprises storing the (believed) location of each in the commissioning database 21 mapped to its respective sensor ID.

Note that the commissioning database 21 could be anything from a large database down to a small look-up table. It could be implemented on a single device or multiple devices (e.g. computing apparatus 20 represents a distributed server, or a combination of server and user terminal). E.g. the table mapping the vision sensor locations to the vision sensor IDs could be implemented separately from the table mapping the luminaire locations to the luminaire IDs. Of course it will also be appreciated that the commissioning could be performed over different occasions, and/or by more than one technician. E.g. the commissioning of the sensor units 3 could be performed by a different commissioning technician on a later occasion than the commissioning of the luminaires 4.

Knowing the locations of the luminaires and the sensors 3 allows the position of the luminaires 4 relative to the sensor units 3 to be known. According to the present disclosure, this is advantageously exploited in order to check for faults or other problems with the sensor units 3. In fact, for the purposes of the present disclosure, only the relative locations of the sensor units 3 to each other need to be known in order to determine faults and the locations of luminaires 4 relative to the sensor units 3 need be known (e.g. stored in terms of a vector in the commissioning database 21) to enable a recommissioning of luminaires to a sensor where a fault in a sensor unit is determined. However, for other purposes it may alternatively or additionally be desired to store the absolute locations of the sensor units 3 and/or luminaires 4 in the commissioning database 21, such as to enable the absolute location of a person (e.g. on a floorplan or map) to be determined based on the sensor units 3, or to allow the luminaires 4 to be used as a reference for indoor navigation, etc.

The lighting system may furthermore be divided into sub-sets, each sub-set forming a control zone of at least one luminaire and at least one sensor unit configured to generate sensor data for controlling the operation of the at least one luminaire. For example luminaires in a control zone may be occupancy-controlled by sensor units operating as occupancy sensors in that control zone.

In other embodiments, each of one, some or all of the sensor units 3 may be incorporated into the housing of a respective one of the luminaires 4. In this case the locations of the luminaires 4 are known relative to the sensor units 3 implicitly, i.e. can be assumed to be co-located. For such sensor units 3 the commissioning database 21 is not necessarily required for the purpose of checking the sensor units 3, though may optionally be included anyway for other purposes (e.g. again to enable detection of the location of a person 8, or for indoor navigation).

Figure 2A:
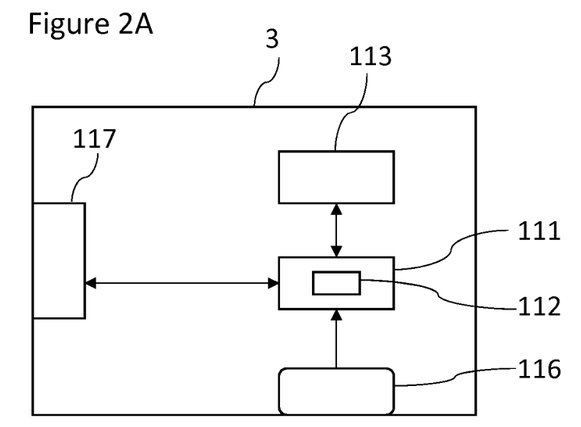
FIG. 2a is a schematic block diagram of a sensor unit.

FIG. 2a shows a block diagram of an example sensor unit 3, representing the individual configuration of each sensor unit 3 in the lighting system 1. The sensor unit 3 comprises: a respective sensor in the form of an occupancy sensor 116, a local processing module 111, a network interface 117, and a local memory 113 connected to the local processing module 111. The sensor 116 is able to detect radiation from the luminaires 4 when illuminating the environment, and is preferably a visible light camera. From this the sensor 116 or the processing module may generate sensor data indicating a binary decision on whether the sensor has detected a person 8 within the environment. However, the use of a thermal camera or other sensor to determine occupancy, nor the use of any other suitable sensor type is not excluded. The local processing module 111 is formed of one or more processing units, e.g. CPUs, GPUs etc.; and the local memory 113 is formed of one or more memory units, such as one or more volatile or non-volatile memory units, e.g. one or more RAMs, EEPROMs ("flash" memory), magnetic memory units (such as a hard disk), or optical memory units. By whatever means implemented, the local memory 113 stores code arranged to run (e.g. execute or be interpreted) on the local processing module 111 (shown by reference 112). The local memory 113 can also store data to be processed or processed by the processing module 111. The processing module 111 thereby being configured to perform operations of the sensor unit 3 in accordance with the following disclosure. Alternatively the processing module 111 could be implemented in dedicated hardware circuitry, or configurable or reconfigurable hardware circuitry such as a PGA or FPGA.

By whatever means implemented, the local processing module 111 is operatively coupled to its respective sensor 116 in order to receive images captured by the image sensor and determine occupancy or other parameters such as light level, light change level etc which can be used as sensor data as described hereafter. The local processing module 111 may be further operatively coupled to the network interface 117 in order to be able to communicate with the processing apparatus 20. The processing apparatus 20 is external to each of the sensor units 3 and luminaires 4, but arranged to be able to communicate with the sensor units via the respective interfaces 117, and to communicate with the luminaires 4 via a similar interface in each luminaire 4 (as shown in FIGS. 2b and 2c hereafter).

Although the following examples furthermore describe the sensor unit 3 comprising the image sensor 116, the sensor unit may comprise a different sensor type. For example the following may be applied to data generated by a light sensor, or occupancy sensor. Furthermore the sensor data generated by the sensor unit may be any suitable sensor data type, for example, occupancy detection values, occupancy parameter values, occupancy binary detection values, occupancy state vector based on applying a hold timer to occupancy binary detection values, illumination values, and change in illumination values.

Figure 2B:
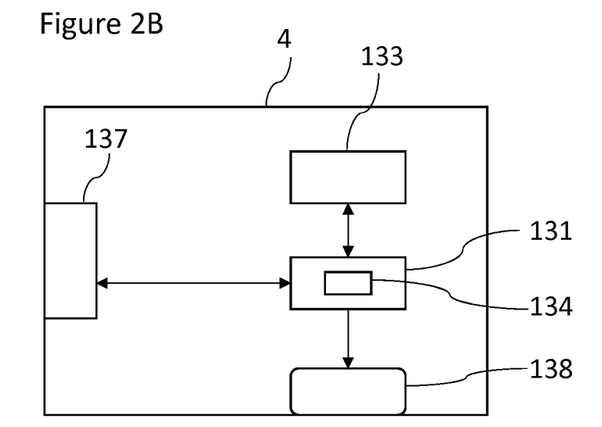
FIG. 2b is a schematic block diagram of a luminaire.

FIG. 2b shows an example of a luminaire 4 in embodiments where the luminaires 4 are separate to the sensor units 3. Here, each luminaire 4 may comprise one or more lamps 138, a respective interface 137, a local memory 133 and a local processing module 131. The local processing module 131 is operatively coupled to the lamp(s) 138 and the interface 137. Each lamp 138 may comprise an LED-based lamp (comprising one or more LEDs), a filament bulb, a gas-discharge lamp or any other type of light source. The memory 133 comprises one or more memory units and the processing module 131 comprising one or more processing units. The local memory 133 stores code arranged to run (e.g. execute or be interpreted) on the local processing module 131 (the code run on the processing module controlling the operation of the lamp is shown by reference 134). The local memory 133 can also store data to be processed or processed by the processing module 131. The processing module 131 thereby being configured to perform operations of a luminaire 4 in accordance with the present disclosure. Alternatively the processing module 131 of the luminaire 4 could be implemented in dedicated hardware circuitry, or configurable or reconfigurable hardware circuitry such as a PGA or FPGA.

Figure 2C:
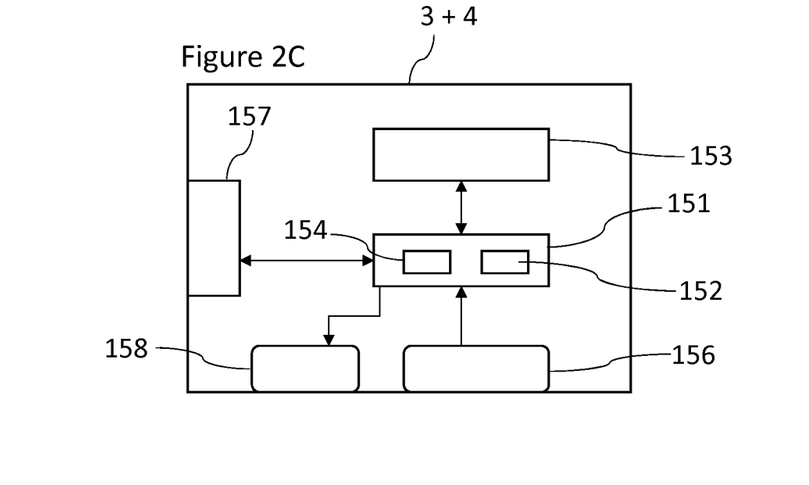
FIG. 2c is a schematic block diagram of a luminaire with an embedded sensor unit.

FIG. 2c shows an example of a variant of the arrangement shown in FIGS. 2a and 2b, wherein the sensor unit 3 is integrated into the same housing as one of the luminaires 4, and therefore the sensor unit 3 is substantially collocated with the respective luminaire 4. In this case, the combined luminaire and sensor 3+4 unit comprises a sensor 156, which may be similar to the sensor 116 shown in FIG. 2a, a local processing module 151, a network interface 157, and a local memory 153 connected to the local processing module 151. The local processing module 151 in a manner similar to the local processing modules shown in FIGS. 2a and 2b may be formed of one or more processing units, e.g. CPUs, GPUs etc.; and the local memory 153 is formed of one or more memory units, such as one or more volatile or non-volatile memory units, e.g. one or more RAMs, EEPROMs ("flash" memory), magnetic memory units (such as a hard disk), or optical memory units. By whatever means implemented, the local memory 153 stores code arranged to run (e.g. execute or be interpreted) on the local processing module 151 (shown by references 152, 154). The local memory 153 can also store data to be processed or processed by the processing module 151. The processing module 151 thereby being configured to perform operations of the combined luminaire and sensor unit in accordance with the following disclosure. Alternatively the processing module 151 could be implemented in dedicated hardware circuitry, or configurable or reconfigurable hardware circuitry such as a PGA or FPGA. The local processing module 151 is operatively coupled to its respective camera 156 in order to receive images captured by the sensor 156, and is also operatively coupled to the network interface 157 in order to be able to communicate with the processing apparatus 20. The processing apparatus 20 is external to the combined sensor units and luminaire 3+4, but arranged to be able to communicate with other sensor units and/or luminaires via the respective interface 157. The combined sensor unit and luminaire may comprise one or more lamps 158. The local processing module 152 is operatively coupled to the lamp(s) 158. Each lamp 158 may comprise an LED-based lamp (comprising one or more LEDs), a filament bulb, a gas-discharge lamp or any other type of light source. The processing module 151 furthermore is configured to perform operations of a combined sensor unit and luminaire in accordance with the present disclosure. Alternatively separate interfaces and/or separate local processing modules could be provided for each of the sensor and luminaire functions, but in the same housing.

In general each of the above-mentioned interfaces 117, 137, 157 could be a wired or wireless interface, but is preferably wireless. For example in embodiments the interface 117 of each of the sensor units 3, and the interface 137 of each of the luminaires 4, may be a ZigBee interface arranged to connect to the gateway 10 using a first wireless networking protocol such as one of the ZigBee standards, e.g. ZigBee Light Link; while the processing apparatus 20 (e.g. a server, or a desktop computer, laptop, tablet or smartphone running a suitable application) connects to the gateway 10 via a second wireless networking protocol such as Wi-Fi or Bluetooth. The gateway 10 then converts between the protocols to allow the external processing apparatus 20 to communicate in one or both directions with the sensor units 3 and luminaires 4. Alternatively, the interface 117 in each of the sensor units 3, and the interface 137 in each of the luminaires 4, may comprise an interface of a type (e.g. Wi-Fi or Bluetooth) directly compatible with that of the external processing apparatus 20, thus allowing the communication to occur directly between the processing apparatus 20 and the sensor units 3 and luminaires 4 without the need for a gateway 10. Generally the network can have any suitable network topology, for example a mesh topology, star topology or any other suitable topology that allows signals to be transmitted and received between each luminaire 4 and the gateway 10 and/or processing apparatus 20.

Whatever the network topology, the external processing apparatus 20 is configured to send control commands to the sensor units 3 and luminaires 4 and to receive information back from the sensor units 3 and luminaires 4, via the relevant interfaces 117, 137, 157. This includes receiving soft or hard presence decisions from the sensor units 3. The various communications disclosed herein between components 3, 4, 20 may be implemented by any of the above-described means or others, and for conciseness will not be repeated each time.

The local processor 131 of the luminaire 4 (or the local processor 151 of the combined unit 3+4) is connected to the lamp(s) 138 (or 158), to allow local lighting control code 132 (or 154) executed on the local processor 131 (or 151) to control the dimming level of the illumination emitted by the lamp(s) 138 (or 158), and or to switch the emitted illumination on and off. Other illumination characteristic(s) such as colour may also be controllable. Where the luminaire 4 comprises multiple lamps 138, 158 these may be individually controllable by the local processor 131 (or 151), at least to some extent. For example, different coloured lamps or elements of a lamp may be provided, so that the overall colour balance can be controlled by separately controlling their individual illumination levels.

The local controller 131 of the luminaire 4 (or the local processor 151 of the combined unit 3+4) may be configured to control one or more such properties of the emitted illumination based on lighting control commands received via the interface 117 (157) from the external processing apparatus 20. E.g. the processing apparatus 20 may comprise a server arranged to receive presence metrics from the sensor units 3 indicative of where people are present in the environment 2, and make decisions as to which luminaries 4 to turn on and off, or which to dim up and down and to what extent, based on an overview of the presence detected by the different sensor units 3. And/or, the processing apparatus 20 may comprise a user terminal such as a smartphone, tablet or laptop running a lighting control application (or "app"), though which the user can select a desired adjustment to the emitted illumination, or select a desired lighting effect or scene to be created using the illumination. In this case the application sends lighting control commands to the relevant luminaires 4 to enact the desired adjustment or effect. In further alternative or additional arrangements, the local controller 131 of the luminaire 4 (or the local processor 151 of the combined unit 3+4) may be configured to control any one or more of the above properties of the illumination based on signals received from one or more other sources, such as one or more of the sensor units 3. E.g. if a sensor unit 3 detects occupancy then it may send a signal to a neighbouring luminaire 4 to trigger that luminaire to turn on or dim up.

In each sensor unit 3 (or combined unit 3+4) the respective sensor 116 (or 156) is connected to supply, to its local processor 111 (151), raw image data captured by the image sensor to which a local person detection algorithm is applied by local image processing code 112 (152) executed on the local processor 111 (151) in order to generate a binary decision whether a person is within the environment and sensed by the sensor. The local person detection algorithm can operate in a number of ways based any suitable image recognition techniques (e.g. facial recognition and/or body recognition). Based on this, the local person detection algorithm may generate one or more "presence metrics" indicative of whether a person 8 is detected to be present in a still image or moving image (video) captured by the image sensor, and or how many people are detected to be so present. For example the one or more presence metrics may comprise: a hard indication of whether or not a person 8 is detected to be present in the image (yes/no), a soft indication of whether or not a person 8 is detected to be present in the image (an indication of a degree of certainty such as a percentage), or a momentary count of people 8 simultaneously present in the image, a count of the number of people appearing in the image over a certain window of time, and/or a rate at which people appear in the image. The code running on the local processing module may report this information to the external processing apparatus 20.

Note, detecting whether a person appears in an image may comprise detecting whether a whole person appears in the image, or detecting whether at least a part of a person appears in the image, or detecting whether at least a specific part or part of a person appears in the image. The detection could also be comprise whether a specific person appears in the image, or detecting whether a specific category of person appears in the image, or detecting whether any person appears in the image.

The above detection may be performed based on analysing a high resolution version of the captured image, preferably the full resolution with which the image was originally captured. In some embodiments the code running on the local processing module also quantizes the captured image down to a substantially lower resolution and reports this to the external processing apparatus 20 (via the interface 117, 157).

The sensor unit 3 may automatically and unconditionally report the image to the external processing apparatus 20 each time an image is captured, or may report it periodically. Alternatively the sensor unit 3 may automatically report the image to the external processing apparatus 20 only in response to an event.

By way of illustration, embodiments below may be described in terms of separate sensor units 3 and luminaries 4, as shown in FIGS. 1, 2a and 2b, but it will be appreciated that the various teachings disclosed herein can also apply in relation to the integrated arrangement of FIG. 2c.

Figure 3:
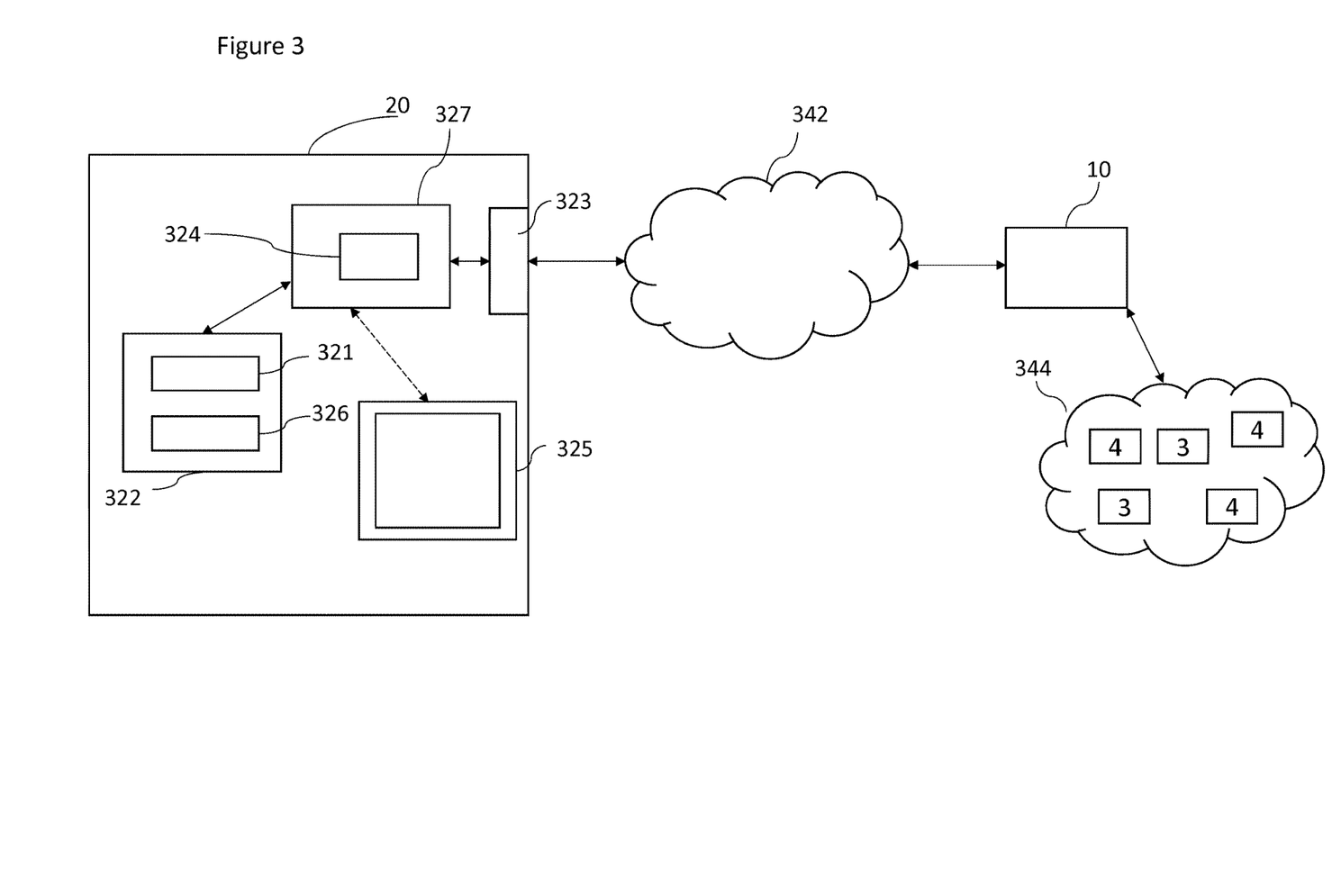
FIG. 3 is a schematic block diagram illustrating an exemplary control architecture of a lighting system showing a central processing unit for operating a lighting system.

FIG. 3 shows an exemplary lighting system control architecture for implementing a remote or networked connection between the external processing apparatus 20 and the gateway 10 according to some embodiments. Here, the external processing apparatus or computer device 20 is connected to the gateway 10 via a packet basic network 342, which is a TCP/IP network in this example. The external processing apparatus 20 communicates with the gateway 10 via the packet based network 342 using TCP/IP protocols, which may for example be effected at the link layer using Ethernet protocols, Wi-Fi protocols, or a combination of both. The network 342 may for example be a local area network (business or home network), the Internet, or simply a direct wired (e.g. Ethernet) or wireless (e.g. Wi-Fi) connection between the external processing apparatus 20 and the gateway 10. The lighting network 344 is a ZigBee network in this example, in which the luminaires 4 and sensor units 3 communicate with the gateway 10 using ZigBee protocols. The gateway 10 performs protocol conversion between TCP/IP and ZigBee protocols, so that the central computer 20 can communicate with the luminaires 4 and sensor units 3 via the packet based network 342, the gateway 10 and the lighting network 344.

Anywhere herein where there is referred to a processing apparatus 20 external to the sensor units 3 an luminaires 4, this may comprise any one or more computer devices or units arranged according to any of the possibilities discussed above or others. Note also that "external" or "externally" means the processing apparatus 20 is not housed within any shared housing (casing) of any of the sensor units 3, and in embodiments nor in any housing of the luminaires 4. Further, this means the processing apparatus communicates with all of the involved sensor units 3 (and in embodiments luminaires 4) only using an external connection via a networked and/or wireless connection, e.g. via the gateway 10, or via a direct wireless connection.

The processing apparatus 20 may take the form of a server, or a static user terminal such as a desktop computer, or a mobile user terminal such as a laptop, tablet, smartphone or smart watch. Whatever form it takes, the computer device 20 comprises a processor 327 formed of one or more processing units, and a network interface 323. The network interface 323 is connected to the processor 327. The processor 327 has access to a memory 322, formed of one or more memory devices, such as one or more RAMs, EEPROMs, magnetic memories or optical memories. The memory 322 may be external or internal to the computer device 20, or a combination of both (i.e. the memory 322 can, in some cases, denote a combination of internal and external memory devices), and in the latter case may be local or remote (i.e. accessed via a network). The processor 327 is also connected to a display 325, which may for example be integrated in the computer device 20 or an external display.

The memory 322 of the external processing apparatus 20 stores a database 321. This database 321 contains a respective identifier (ID) of each sensor unit 3 and each luminaire 4 in the lighting system 1 (or just IDs of the luminaires 4 when the sensor units 3 are integrated into luminaires 4). These uniquely identify the sensor units 3 and luminaires 4 within the system 1. Further, the database 321 also contains an associated location identifier of each sensor unit 3 and luminaire (of again just the location identifiers of the luminaires 4 if the sensor units are integrated into luminaires). For example, each location identifier may be a two dimensional identifier (x,y) or three dimensional location identifier (x,y,z) (e.g. if the sensor units 3 are installed at different heights). The location identifier may convey only relatively basic location information, such as a grid reference denoting the position of the corresponding luminaire 4 or sensor unit in a grid—e.g. (m,n) for the mth column and nth row—or it may convey a more accurate location on a floor plan or map, e.g. meters, feet or arbitrary units, to any desired accuracy. The IDs of the luminaires 4 and sensor units 3, and their locations, are thus known to the processing apparatus 20. The memory 322 may also store additional metadata 326, such as an indication of the sensor control area or control zone. The processor 327 is shown executing sensor data analysis code 324, from the memory 322.

The network interface 323 can be a wired interface (e.g. Ethernet, USB, FireWire) or a wireless interface (e.g. Wi-Fi, Bluetooth, ZigBee), and allows the external processing apparatus 20 to connect to the gateway 10 of the lighting system 1. The gateway 10 operates as an interface between the external processing apparatus 20 and the lighting network, and thus allows the external processing apparatus 20 to communication with each of the luminaires 4 and sensor units 3 via the lighting network. The gateway 10 provides any necessary protocol conversion to allow communication between the external processing apparatus 20 and the lighting network. Alternatively the interface 323 may enable the computer device 20 to connect directly to the luminaires 4 and sensor units 3. Either way, this allows the external processing apparatus 20 to transmit control signals to each of the luminaires 4 and receive the sensor data from each of the sensors 3.

Note that the figures herein are highly schematic. In particular, the arrows denote high-level interactions between components of the luminaires 4, sensor units 3 and external processing apparatus 20 and do not denote any specific configuration of local or physical connections.

Note that the external processing apparatus 20 may be local to the environment 2 (e.g. present in the environment 2 or in the same building) or may be remote from it (at a remote geographic site), or the external processing apparatus 20 may even comprise a combination of local and remote computer devices. Further, it may connect to the gateway 10 via a single connection or via another network other than the lighting network.

The external processing apparatus 20 or a unit for identifying a sensor unit at fault having received and stored sensor data from the sensor units over a significant time period may use this sensor data to determine whether any of the sensor units are faulty or at error and furthermore to either generate a suitable indicator/message which identifies the fault or error or to enable a recommissioning of the luminaires to account for the fault or error. In the following examples the sensor data analysed may be occupancy state time series, which provide a binary detection value which identifies whether or not the sensor determines whether there is a person within the sensor's range. The same methods may be applied in some embodiments to sensor data with respect to light values or changes in light values identified by a light sensor.

Figure 4:
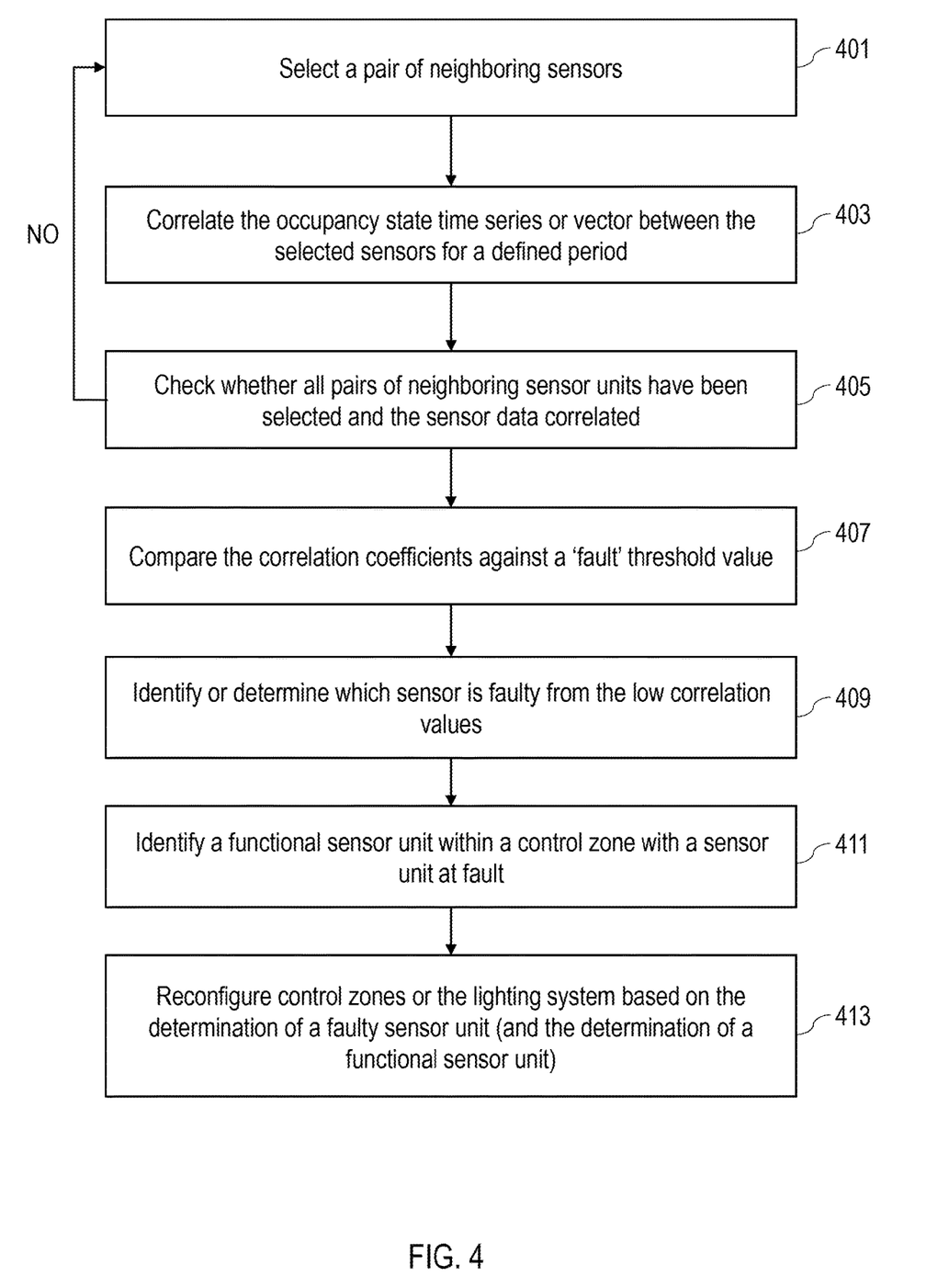
FIG. 4 is a flow diagram illustrating a method of operating the central processing unit shown in FIG. 3.

For example the sensor data analysis code 324 may be configured to perform the operations as shown in FIG. 4.

The unit for identifying the sensor unit at fault of the external processing apparatus 20 and the processor 327 in executing the sensor data analysis code 324 may be configured to select a pair of neighbouring sensors. For example a pair of neighbouring (either in same control zone, or across neighbouring zones) occupancy sensors m and n from among N≥2 sensors (either in the same or neighbouring control zones) may be selected. The sensors may be selected or chosen based on the information from the database 321.

The operation of selecting a pair of neighbouring sensors is shown in FIG. 4 by step 401.

The unit or external processing apparatus 20 and the processor 327 in executing the sensor data analysis code 324 may then be configured to retrieve the sensor data associated with the selected pair of neighbouring sensors. For example the sensor data may be occupancy state time series associated with the selected neighbouring sensors. In other words the occupancy sensors may generate binary detection values every T seconds (where T may be a suitable value such as 1 s or 60 s). This data may be stored at a remote database and is available to be retrieved by the processor 327. The dataset may be available for long time period, for e.g. days, weeks or months. In some embodiments from the raw binary detection values, an occupancy state vector is generated by applying a hold timer of H seconds. That is, subsequent to a detection if the occupancy sensor does not report a detection within H seconds, the vector goes into an unoccupied state (0); else, it results in an occupied state (1). The occupancy state vector for sensor m can be denoted by $s_m$, and the occupancy state vector for sensor n can be denoted by $s_n$. Although in this example the occupancy state vector is generated by the processor 327 from the raw binary detection output of the sensor, the sensor unit can in some embodiments perform this processing operation and output the state vector. In some embodiments the sensor unit may store the state vector for the analysis period and supply the vector directly or may periodically or in response to a request or other manner supply output the vector to be stored at the external memory 322.

In some embodiments the sensor data may be light (illumination) levels or light (illumination) level change.

The unit or external processing apparatus 20 and the processor 327 in executing the sensor data analysis code 324 may then determine correlation parameters from the sensor data. In other words the processor may compute a correlation coefficient of the occupancy state vectors across the selected neighbouring sensors (for example sensor unit m and sensor unit n) for a determined or defined length of the vector. This correlation coefficient calculation may be mathematically represented as:

$$\alpha_{m,n} = \frac{<s_m - \bar{s}_m, s_n - \bar{s}_n>}{|s_m - \bar{s}_m||s_n - \bar{s}_n|}$$

Where $\alpha_{m,n}$ is the correlation parameter for a first sensor unit m and a second sensor unit n within a selected pair of neighbouring sensor units, $s_m$ is the instantaneous sensor data for the first sensor unit, $s_n$ is the instantaneous sensor data for the second sensor unit, $\bar{s}_m$ and $\bar{s}_n$ are respectively the arithmetic mean of the sensor data of the first and second sensor units, < > a correlation operation and || a norm operation.

The operation of correlating the occupancy state time series or vector between the selected sensors for a defined period selecting a pair of neighbouring sensor is shown in FIG. 4 by step 403. Of course, the intantaneous value $s_m$ and $s_n$ must be sampled at a same time or at least in a close time in such a way they can normally have the same kind of variation in view of a same detected event, The unit or external processing apparatus 20 and the processor 327 in executing the sensor data analysis code 324 may then determine whether 'all' of the pairs of neighbouring sensors have been selected. The selection may be a sub-set of, or all of, the sensors within an environment.

The operation of checking whether all pairs of neighbouring sensor units have been selected and the sensor data correlated is shown in FIG. 4 by step 405.

Where it is determined that not 'all' of the pairs of neighbouring sensors have been selected then the external processing apparatus 20 and the processor 327 in executing the sensor data analysis code 324 may then select another pair of neighbouring sensors and repeat the operations of retrieving and correlating sensor data. The selection of further pairs of neighbouring sensors may be made by any suitable selection algorithm.

The operation of repeating the selection and correlation is shown in FIG. 4 by the arrow looping back to the step 401.

Where all of the sensor pairs have been selected and the correlation parameters determined then the unit or external processing apparatus 20 and the processor 327 in executing the sensor data analysis code 324 may then monitor the determined correlation parameters to determine or identify whether there is a sensor unit which is faulty, and furthermore identify the at fault sensor unit.

For example the processor following the determination of the correlation coefficients compare the correlation coefficients for each selected pair of sensor units against a defined or determined threshold value to determine whether one or other of the sensors within the selected pair has a fault.

For example if $\alpha_{m,n} < \tau$, where $\tau$ is the threshold value, it can be determined that one of the sensor units within the selected pair is faulty. The threshold value may be preset or determined from training datasets. Such a threshold corresponds to the allowable difference of the sensor information link to the spatial positioning of the sensors. In other words, same event is detected but not necessarily with exactly the same intensity.

The operation of comparing the correlation coefficients against a 'fault' threshold value is shown in FIG. 4 by step 407.

The unit or external processing apparatus 20 and the processor 327 in executing the sensor data analysis code 324 may then be configured to determine or identify which sensor unit is likely to be at fault. The at fault sensor unit may be determined where there is a sensor unit common to two or more comparisons. In other words when N≥3, a sensor common to pairs of sensors with low correlation value can be declared to be faulty. For example, for three sensors m, n and p, if $\alpha_{m,n} > \tau$, while $\alpha_{m,p} < \tau$ and $\alpha_{n,p} < \tau$, then sensor p is declared to be faulty.

In some embodiments a message may be generated and sent to the facility manager identifying the sensor unit declared to be faulty for further inspection. In some embodiments the unit may pass this information to a unit for controlling the lighting system.

The operation of identifying or determining which sensor is faulty from the low correlation values is shown in FIG. 4 by step 409.

Furthermore in some embodiments the external processing apparatus 20 and the processor 327 in executing the sensor data analysis code 324 is configured to recommission or reconfigure to lighting system to take into account of the sensor unit at fault.

For example in some embodiments the system comprises a unit for identifying a functional sensor unit. The unit or external processing unit may be configured to identify a functional sensor unit for each control zone which has a determined sensor unit at fault. The functional sensor unit in some embodiments is determined by identifying the sensor unit which with the highest correlation coefficient of occupancy state time series with neighbouring sensors. In some embodiments this may be a highest average correlation coefficient where the correlation coefficients which are associated with a sensor are added and then divided by the number of correlation coefficients which are associated with the sensor. The unit may generate a message comprising the identified functional sensor unit and send this message to the unit for controlling the lighting system.

The identification of a functional sensor unit within a control zone with a sensor unit at fault is shown in FIG. 4 by step 411.

Having identified the functional sensor unit for the control zone the processor 327 in executing the sensor data analysis code 324 (or a unit of controlling the lighting system) may then associate all of the luminaires within the control zone currently associated with the determined sensor unit at fault with the functional sensor unit.

The operation of reconfiguring control zones or the lighting system based on the determination of a faulty sensor unit (and the determination of a functional sensor unit) is shown in FIG. 4 by step 413

In some embodiments the external processing apparatus 20 and the processor 327 in executing the sensor data analysis code 324 may then end the operation.

Although the example shown with respect to FIG. 4 shows the use of occupancy sensor data in an alternate embodiments the sensors are light sensors, and the vector generated and analysed is a light (change) vector consisting of illumination (change) measurements.

Figure 5:
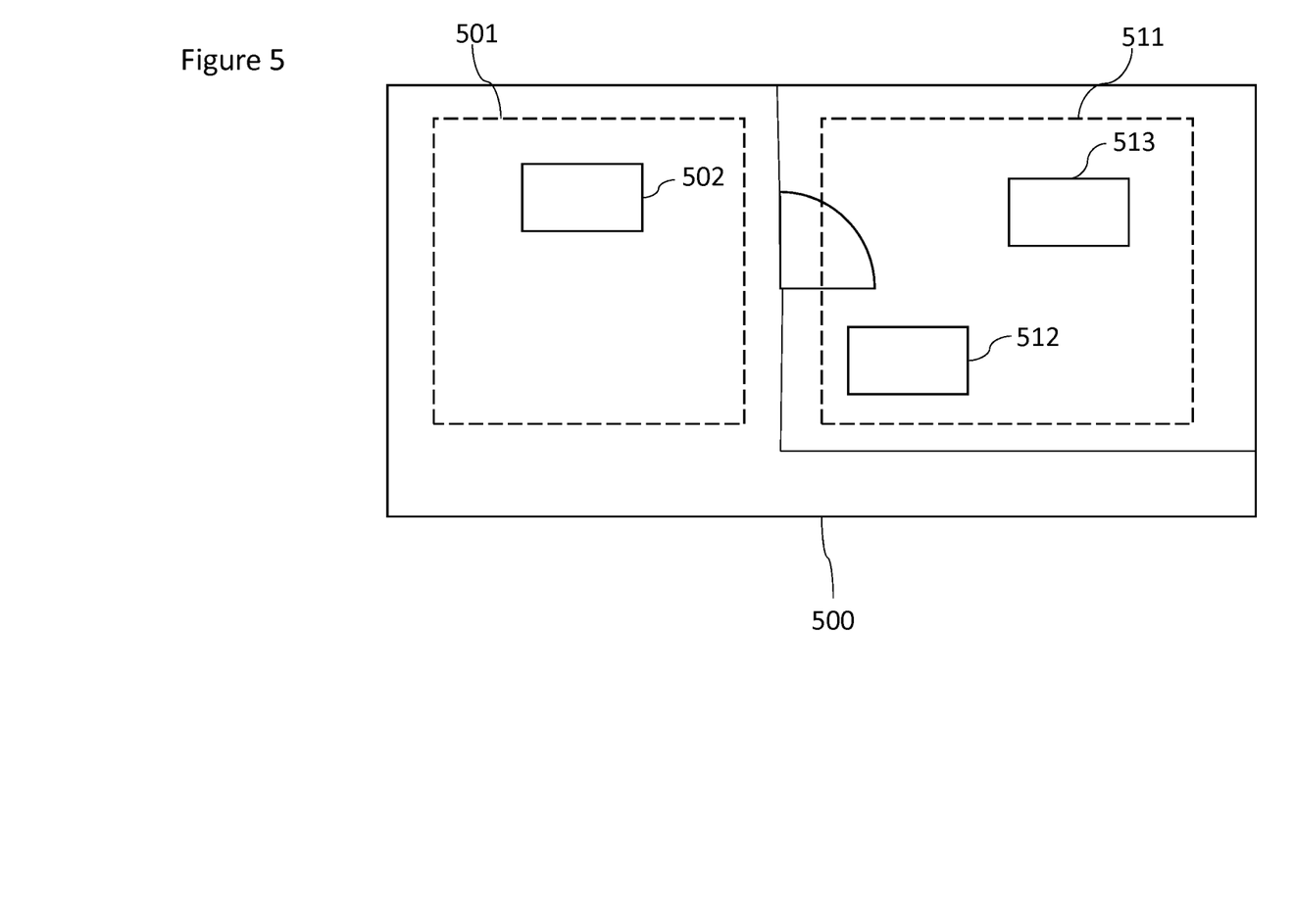
FIG. 5 is a schematic illustration of a plan view of an example lighting system configuration.
Figure 6:
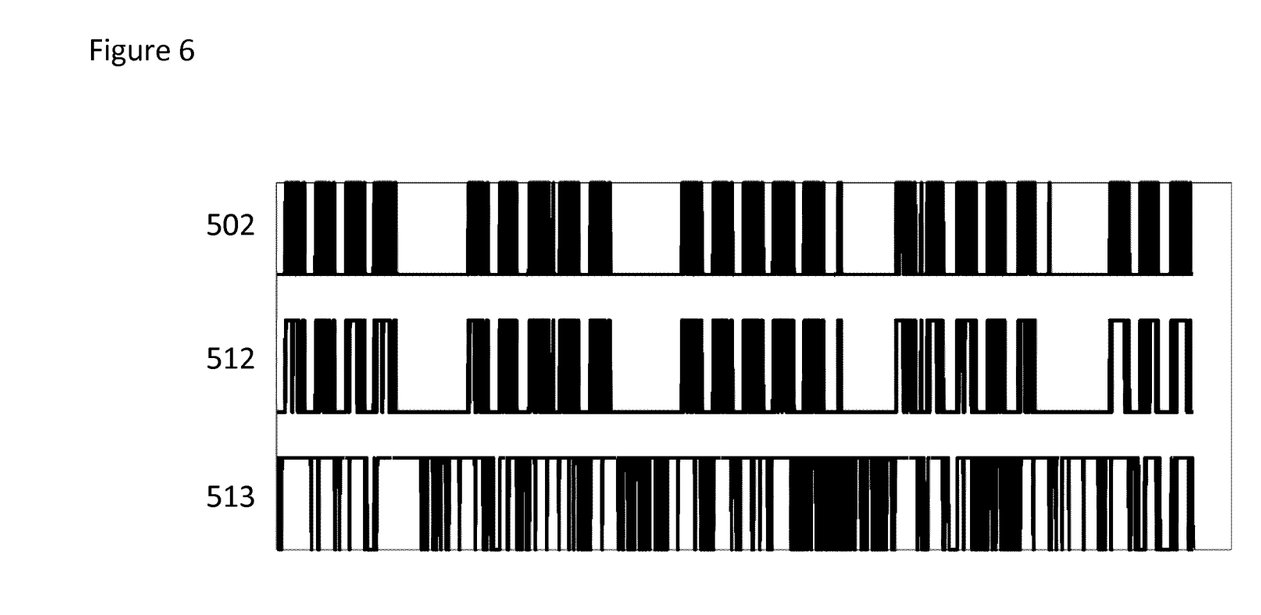
FIG. 6 is a schematic illustration of a sensor output graph produced by the example lighting system shown in FIG. 5.

An example of the operation of the external processing apparatus 20 and the processor 327 in executing the sensor data analysis code 324 for a simulated light system is shown with respect to FIGS. 5 and 6.

FIG. 5 shows a schematic illustration of a plan view of an example lighting system configuration. The plan view shows an environment 500 which is divided into two control zones or areas. A first control zone 501 comprises a first occupancy sensor 502. A second control zone 511 comprises a second occupancy sensor 512 and a third occupancy sensor 513. FIG. 6 shows example occupancy state information collected from the sensors over a period of time.

In such an example the first occupancy sensor 502 can be configured to output sensor data $s_1$, the second occupancy sensor 512 configured to output sensor data $s_2$, and the third occupancy sensor 513 configured to output sensor data $s_3$. This data may be stored and used by the processor 327.

The processor 327 executing the sensor data analysis code may then be configured to select a first pair of neighbouring sensors, for example the first occupancy sensor 502 and the second occupancy sensor 512.

The processor 327 may then retrieve the occupancy sensor data associated with the selected sensors. For the first selection the processor may be configured to retrieve the sensor data $s_1$ and sensor data $s_2$.

In this example the sensor data is the binary occupancy state value, in other words a binary determination of whether the sensor determines an area is occupied. From the sensor values the processor 327 may determine occupancy state vectors and from these determine a correlation coefficient associated with the selection of the first and second occupancy sensor. For example the formula listed above may be used:

$$\alpha_{1,2} = \frac{<s_1 - \bar{s}_1, s_2 - \bar{s}_2>}{|s_1 - \bar{s}_1||s_2 - \bar{s}_2|}$$

Where $\alpha_{1,2}$ is the correlation parameter for the first occupancy sensor 502 and the second occupancy sensor 512. This formula may be expanded to $$\alpha_{1,2} = \frac{\sum_i \left(s_1^{(i)} - \frac{1}{N}\sum_i s_1^{(i)}\right) \cdot \left(s_2^{(i)} - \frac{1}{N}\sum_i s_2^{(i)}\right)}{\sqrt{\left(s_1^{(i)} - \frac{1}{N}\sum_i s_1^{(i)}\right)^2} \cdot \sqrt{\left(s_2^{(i)} - \frac{1}{N}\sum_i s_2^{(i)}\right)^2}}$$

where N values of $s_1$ and $s_2$ from first occupancy sensor 502 and the second occupancy sensor 512 are used to compute the correlation coefficient, and $s_1^{(i)}$ is the i-th value in $s_1$, and $s_2^{(i)}$ is the i-th value in $s_2$.

In this example the determined correlation coefficient is $\alpha_{1,2}=0.86$.

The processor 327 executing the sensor data analysis code may then be configured to select a second pair of neighbouring sensors, for example the first occupancy sensor 502 and the third occupancy sensor 513.

The processor 327 may then retrieve the occupancy sensor data associated with the selected sensors. For the second selection the processor may be configured to retrieve the sensor data $s_1$ and sensor data $s_3$.

From the sensor values the processor 327 may determine occupancy state vectors and from these determine a correlation coefficient associated with the selection of the first and second occupancy sensor. For example the formula listed above may be used:

$$\alpha_{1,3} = \frac{<s_1 - \bar{s}_1, s_3 - \bar{s}_3>}{|s_1 - \bar{s}_1||s_3 - \bar{s}_3|}$$

Where $\alpha_{1,3}$ is the correlation parameter for the first occupancy sensor 502 and the third occupancy sensor 513. This formula may be expanded to $$\alpha_{1,2} = \frac{\sum_i \left(s_1^{(i)} - \frac{1}{N}\sum_i s_1^{(i)}\right) \cdot \left(s_3^{(i)} - \frac{1}{N}\sum_i s_3^{(i)}\right)}{\sqrt{\left(s_1^{(i)} - \frac{1}{N}\sum_i s_1^{(i)}\right)^2} \cdot \sqrt{\left(s_3^{(i)} - \frac{1}{N}\sum_i s_3^{(i)}\right)^2}}$$

where N values of $s_1$ and $s_3$ from first occupancy sensor 502 and the third occupancy sensor 513 are used to compute the correlation coefficient, and $s_1^{(i)}$ is the i-th value in $s_1$, and $s_3^{(i)}$ is the i-th value in $s_3$.

In this example the determined correlation coefficient for the second pair selection is $\alpha_{1,3}=0.12$.

In this example the processor 327 executing the sensor data analysis code may then be configured to select a third pair of neighbouring sensors, the second occupancy sensor 512 and the third occupancy sensor 513.

The processor 327 may then retrieve the occupancy sensor data associated with the selected sensors. For the third selection the processor may be configured to retrieve the sensor data $s_2$ and sensor data $s_3$.

From the sensor values the processor 327 may determine occupancy state vectors and from these determine a correlation coefficient associated with the selection of the first and second occupancy sensor. For example the formula listed above may be used:

$$\alpha_{2,3} = \frac{<s_2 - \bar{s}_2, s_3 - \bar{s}_3>}{|s_2 - \bar{s}_2||s_3 - \bar{s}_3|}$$

Where $\alpha_{2,3}$ is the correlation parameter for the first occupancy sensor 502 and the third occupancy sensor 513. This formula may be expanded to $$\alpha_{1,2} = \frac{\sum_i \left(s_2^{(i)} - \frac{1}{N}\sum_i s_2^{(i)}\right) \cdot \left(s_3^{(i)} - \frac{1}{N}\sum_i s_3^{(i)}\right)}{\sqrt{\left(s_2^{(i)} - \frac{1}{N}\sum_i s_2^{(i)}\right)^2} \cdot \sqrt{\left(s_3^{(i)} - \frac{1}{N}\sum_i s_3^{(i)}\right)^2}}$$

where N values of $s_1$ and $s_3$ from first occupancy sensor 502 and the third occupancy sensor 513 are used to compute the correlation coefficient, and $s_2^{(i)}$ is the i-th value in $s_2$, and $s_3^{(i)}$ is the i-th value in $s_3$. In this example the determined correlation coefficient for the third pair selection is $\alpha_{2,3}=0.15$.

The processor 327 may then determine that all neighbouring sensor pairs have been selected and correlation parameters determined.

The unit or external processing apparatus 20 and the processor 327 in executing the sensor data analysis code 324 may then monitor the determined correlation parameters to determine or identify whether there is a sensor unit which is faulty, and furthermore identify the at fault sensor unit by comparing the correlation coefficients for each selected pair of sensor units against a defined or determined threshold value to determine whether one or other of the sensors within the selected pair has a fault.

Thus for example where the correlation parameters for the first, second and third pair selections are $\alpha_{1,2}=0.86$, $\alpha_{1,3}=0.12$ and $\alpha_{2,3}=0.15$, each of these coefficients are compared against a determined threshold value, for example $\tau=0.4$, and the result of the comparison stored.

Thus, for the above example, the processor would determine that the correlation coefficients $\alpha_{1,3}$, $=0.12$ and $\alpha_{2,3}=0.15$ are less than the threshold value.

The processor is then configured to determine whether there is a sensor unit in common to the two 'failed' comparisons. In this example there is a sensor unit in common, the third occupancy sensor 513. The processor may then determine that the third occupancy sensor 513 is the faulty occupancy sensor.

In some embodiments the processor may generate a message and sent this message to a lighting system manager indicating that the third occupancy sensor 523 is faulty and should be investigated. In some embodiments furthermore the processor may determine a functional sensor unit within the second control zone 511.

For example the processor or lighting commissioning software may be configured to analyse the correlation parameters for the sensor units within the second control zone 511 and select the sensor unit with the highest correlation parameter as the functional sensor unit. In this example there are only two sensor units within the second control zone 511, the second sensor unit 512 and the third sensor unit 513.

The correlation parameters associated with the second sensor unit 512 are $\alpha_{1,2}=0.86$, and $\alpha_{2,3}=0.15$, which has an absolute highest value of 0.86 and an average of 0.505.

The correlation parameters associated with the third sensor unit 513 are $\alpha_{1,3}=0.12$ and $\alpha_{2,3}=0.15$, which has an absolute highest value of 0.15 and an average of 0.135.

The highest correlation parameter (both absolute and average) in this example is associated with the second sensor unit 512 and thus the processor may select a functional sensor within the second control zone 511 as bring the second sensor 512.

The processor may then instruct the lighting commissioning software to reconfigure the luminaires within the second control zone 511 to be controlled by the functional sensor, the second control unit 512.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for identifying sensor units at fault in a lighting system performed using three or more sensor units, each respective one of the sensor units comprising a respective sensor configured to generate sensor data over time, the lighting system comprising a processing apparatus external to the sensor units for performing the following steps of the method:
   receiving from each of the sensor units the sensor data;
   generating spatial correlation parameters from the sensor data for all neighboring sensor units, the spatial correlation parameter representing whether the sensor data output from the neighboring sensor units is linearly related; and
   monitoring the spatial correlation parameters to determine a sensor unit at fault.

2. The method as claimed in claim 1, wherein generating correlation parameters from the sensor data for all neighboring sensor units comprises:
   Selecting all neighboring sensor units; and
   correlating the sensor data for all neighboring sensor units to generate one spatial correlation parameter associated to each pair.

3. The method as claimed in claim 2, wherein correlating the sensor data for the selected pairs of neighboring sensor units to generate correlation parameters comprises determining:

$$\alpha_{m,n} = \frac{<s_m - \bar{s}_m, s_n - \bar{s}_n>}{|s_m - \bar{s}_m||s_n - \bar{s}_n|}$$

Where $a_{m,n}$ is the correlation parameter for a first sensor unit m and a second sensor unit n within a selected pair of neighboring sensor units, $S_m$ is the sensor data for the first sensor unit, Sn is the sensor data for the second sensor unit, $\bar{S}_m$ and $\bar{S}_n$ are respectively the arithmetic mean of the sensor data of the first and second sensor units, < > a correlation operation and a ∥ norm operation.

4. The method as claimed in claim 1, wherein the respective sensor is an occupancy sensor and receiving from each of the sensor units the sensor data comprise receiving from each of the sensor units at least one of:
   occupancy detection values;
   occupancy parameter values;
   occupancy binary detection values; and
   occupancy state vector based on applying a hold timer to occupancy binary detection values.

5. The method as claimed in claim 1, wherein the respective sensor is a light sensor and receiving from each of the sensor units the sensor data comprise receiving from each of the sensor units at least one of:
   illumination value; and
   change in illumination value.

6. The method as claimed in claim 1, wherein monitoring the correlation parameters to determine the sensor unit at fault comprises:
   determining a sensor unit at fault by determining a sensor unit common to at least two identified selected pairs of neighboring sensor units where the correlation parameters from the time sequence of sensor data for selected pairs of neighboring sensor units is less than a defined threshold value.

7. The method as claimed in claim 6, wherein determining the sensor unit at fault by determining the sensor unit common to at least two identified selected pairs of sensor units where the correlation parameter from the sensor data for selected pairs of neighboring sensor units is less than a defined threshold value comprises:
   comparing, for multiple selections of neighboring sensor units, the correlation parameters from the sensor data for selected pairs of neighboring sensor units with the defined threshold value;
   identifying sensor units where the correlation parameters from the sensor data for the selected pairs of neighboring sensor units are less than the defined threshold value; and
   identifying multiple occurrences of the identified sensor units where the correlation parameters from the sensor data for selected pairs of neighboring sensor units are less than the defined threshold value.

8. The method as claimed in claim 6, further comprising at least one of:
   generating at least one message identifying the sensor unit at fault, the at least one message to be reported to a facilities manager; and
   reconfiguring the lighting system based on determining the sensor unit at fault.

9. The method as claimed in claim 8, wherein reconfiguring the lighting system based on determining the sensor unit at fault further comprises:
   identifying a control zone which comprises the sensor unit at fault;
   identifying a functional sensor unit within the control zone which comprises the sensor unit at fault; and
   associating at least one luminaire within the control zone currently associated with sensor unit at fault with the functional sensor unit.

10. The method as claimed in claim 9, wherein identifying a functional sensor unit within the control zone which comprises the sensor unit at fault comprises:
    identifying a sensor unit within the control zone with the highest correlation parameters to each other neighboring sensor unit.

11. A computer program product comprising code embodied on a nontransitory computer-readable storage medium, the code being configured so as when run on said external processing apparatus to perform the method of claim 1.

12. A lighting system comprising:
three or more sensor units, each respective one of the sensor units comprising a respective sensor configured to generate sensor data over time; and
a processing apparatus external to the sensor units which comprises a unit for identifying a sensor unit at fault operatively coupled to each of the sensor units, wherein the unit for identifying a sensor unit at fault is configured to:
receive from each of the sensor units the sensor data;
generate spatial correlation parameters from the sensor data for each of the
neighboring sensor units, the spatial correlation parameter representing whether the sensor data output from the neighboring sensor units is linearly related; and
monitor the spatial correlation parameters to determine a sensor unit at fault.

13. The lighting system as claimed in claim 12, further comprising:
at least one luminaire within a control zone comprising the at least two sensor units;
and wherein the processing apparatus further comprises:
a unit for identifying a functional sensor unit from the at least two sensor units; and a unit for controlling the lighting system,
wherein
the unit for identifying the sensor unit at fault is configured to generate and send a message identifying the sensor unit at fault to the unit for controlling the lighting system,
the unit for identifying the functional sensor unit is configured to generate and send a message identifying the functional sensor unit to the unit for controlling the lighting system, and
the unit for controlling the lighting system is configured to re-associate the at least one luminaire within the control zone with the functional sensor based on the messages.

14. The lighting system as claimed in claim 12, wherein the unit for identifying a sensor unit at fault is further configured to:
generate at least one message identifying the sensor unit at fault, the at least one message to be reported to a facilities manager.

* * * * *